United States Patent [19]

Spedden et al.

[11] 3,815,957

[45] June 11, 1974

[54] CONTROLLED IN-SITU LEACHING OF MINERAL VALUES

[75] Inventors: Henry Rush Spedden; Emil Edward Malouf, both of Salt Lake City, Utah

[73] Assignee: Kennecott Copper Corporation, New York, N.Y.

[22] Filed: Sept. 11, 1972

[21] Appl. No.: 287,658

[52] U.S. Cl. .................................. 299/5, 166/285
[51] Int. Cl. ............................................ E21b 43/28
[58] Field of Search ..................... 299/4, 5; 166/285

[56] References Cited
UNITED STATES PATENTS

| | | | |
|---|---|---|---|
| 2,777,679 | 1/1957 | Jungstrom | 166/285 |
| 2,850,270 | 9/1958 | Hanson | 299/4 |
| 3,477,509 | 11/1969 | Arendt | 166/285 X |
| 3,713,698 | 1/1973 | Rhoades | 299/4 |

*Primary Examiner*—Ernest R. Purser
*Attorney, Agent, or Firm*—Philip A. Mallinckrodt

[57] ABSTRACT

A freezing liquid, usually a liquified gas easily vaporized by the absorption of heat, e.g. liquified oxygen or nitrogen, is injected into or around an underground area to be treated for the recovery of solid mineral values, usually a naturally occurring deposit of such mineral values as copper sulfides or oxides or a mine waste dump containing same. When injected under pressure into an area of low permeability, the freezing liquid effects hydraulic fracturing of the mineralized solid materials. Control of the operation is preferably achieved by freezing either natural ground water or injected water in boundary zones, e.g. relatively pervious zones adjacent to relatively impervious zones, to provide barriers against dissipation, into such boundary zones, of both the injected freezing liquid and subsequently injected leaching or other treatment fluid. In the instance of natural ground water at least, air under pressure may be advantageously introduced into the area to be treated immediately prior to the introduction of the freezing liquid. When sulfide minerals are involved, liquid oxygen as the freezing liquid will aid in fracturing the underground formation by reason of volume increase due to chemical reaction with the sulfide.

15 Claims, No Drawings

3,815,957

CONTROLLED IN-SITU LEACHING OF MINERAL VALUES

BACKGROUND OF THE INVENTION

1. Field

The invention is in the field of in-situ recovery of underground mineral values by the injection of a leaching liquid thereinto followed by recovery of the resulting pregnant leach solution.

2. State of the Art

Recovery of water-soluble salts, such as NaCl, etc., by so called "solution mining" has long been known. So far as metallic minerals are concerned, there are patents teaching the in-situ leaching of copper ore deposits and mine waste dumps by the injection thereinto of customary leach solutions through well points and pipe casings, see Canadian Pat. Nos. 881,324 and 880,708. Hydraulic fracturing of low porosity oil-and-gas-containing formations by the injection thereinto, through oil and gas wells, of a fracturing liquid under high pressure has long been practiced, and this type of fracturing an underground deposit of metallic minerals is suggested in the aforementioned patents. The use of liquified carbon dioxide as a hydraulic fracturing liquid to eliminate scavenging of the usual fracturing liquids, such as water, is taught by Peterson U.S. Pat. No. 3,108,636.

OBJECTIVE

It is a principal purpose of the present invention to make "solution mining" of in-situ, solid mineral deposits and waste dumps more effective.

SUMMARY OF THE INVENTION

In accordance with the invention, a freezing liquid is utilized as an injection medium in underground deposits of solid mineral values for either hydraulically fracturing such deposits, whether they exist naturally or in mine or mill waste dumps, or for establishing boundary barriers to fluid flow, or both. The freezing liquid is preferably a liquified gas vaporizable by the absorption of heat that is usually supplied automatically and naturally by the underground formation itself.

By including a propping agent, such as a suspension of particulate matter, in the injected freezing liquid, the hydraulically fractured area can be maintained open and relatively porous for the subsequent injection into such area of a treatment fluid, e.g. a leaching liquid, such as a weakly acidic, ferric sulfate solution in the instance of copper sulfide mineral values to be recovered.

In some instances, ground water will be present in the underground area to be treated. Under such circumstances, it is a feature of the present invention that a gas, such as oxygen or ordinary air under pressure is injected into the area to force the water into boundary zones immediately prior to injection of the freezing liquid, where it will be frozen to provide boundary barriers against loss from the area of hydraulic fracturing liquids or other treatment fluids injected into such area.

In the absence of ground water or sufficient ground water to establish required barriers, water may be injected into or bordering the underground area concerned prior to, concurrently with, or following injection of the freezing liquid.

DETAILED DESCRIPTION OF BEST MODE CONTEMPLATED

The best mode presently contemplated of carrying out the invention in practice involves the use of injection wells driven into and/or bordering an underground area containing solid mineral values to be recovered, the depth and placement of such wells being dependent upon the nature of the formation concerned and the values to be recovered; it also involves the use of recovery wells, through which leach solution pregnant with the values are withdrawn in instances of leaching the mineral values by the injection of a fluid leaching agent. The use of wells of this type has been known for many years, and their placement and operation are within the skill of the art.

The method of the invention is especially useful as applied to porphyry copper deposits and to mine waste dumps often associated therewith. In carrying out the method with respect to a porphyry copper deposit, it is desirable to first make a study of the ore body by core drilling and examining the logging data for each drill hole and the drill cores obtained therefrom. This will enable identification of fracture patterns, mineral types, permeability, moisture content, kind and extent of mineral values, and layout of various mineralized zones in the area concerned. As a typical procedure, one or more injection wells are then drilled into the formation as deemed appropriate under the circumstances.

After the injection well or wells are drilled, they are preferably cased and the casing cemented to the naturally leached capping or gossan zone overlying the ore body. The casing of each well is perforated in the zone to be fractured. If ground water is non-existent or sparse, water is preferably injected through the wells into the formation, followed by the injection of gaseous oxygen which displaces the injected water. If ground water is abundant, there is no need to inject water; injection of gaseous oxygen can be commenced immediately to displace such ground water.

Following the injection of gaseous oxygen, which causes the ground water or the injected water to flow into areas of relatively high permeability, liquified oxygen, with or without a particulate propping agent as deemed advisable, is pumped into the injection well or wells at just enough pressure to introduce it into the formation and freeze the water present in the zone or zones of relatively high permeability. Pumping pressure is then gradually increased to at least 1.1 pounds per square inch for each foot of depth of the zone to be fractured. Following the fracturing operation, the charge of liquified oxygen is maintained under the restraint of a pressure valve until the pressure drops off appreciably. The cycle can be repeated several times through the same injection well or wells for additional fracturing.

When fracturing of the formation under the controlled conditions afforded by the frozen boundary zones is deemed adequate, the area is left until the ice has melted, and an appropriate leaching solution is then introduced through the injection wells. The strength of such solution will be adequate to compensate for dilution attributable to the water present in the formation.

Recovery of the pregnant leach solution is made either by applying suction to the injection wells or through one or more special recovery wells appropriately located.

A field test carried out on a typical porphyry copper deposit resulted in initial establishment of flow communication of injected liquified oxygen from an injection well to a monitor recovery hole 20 feet distant. As pumping of the liquified oxygen continued, flow communication stopped due to freezing of ground water present in the formation. However, flow communication was established to a second monitor hole 50 feet distant in a different direction. As pumping of liquified oxygen down the injection hole continued, flow communication with the second recovery hole ceased for the same reason, but was established with a third recovery hole 120 feet distant in still another direction. On permitting the formation to thaw and carrying out leaching in the fractured area with the usual weakly acidic, ferric sulfate-sulfuric acid leach solution, the recovered pregnant leach solution contained 17 pounds of copper per 1,000 gallons of solution. In comparison, similar leach solution pumped into the formation and recovered through the same injection and recovery wells prior to applying the procedures of the invention contained less than one pound of copper per 1,000 gallons of solution.

In applying the invention to mine waste dumps, relatively impervious zones will usually be found under pods of impounded water. The freezing liquid is desirably pumped directly into such relatively impervious zones for fracturing such zones and rendering them relatively porous.

We claim:

1. A method of recovering solid mineral values in situ, comprising injecting a freezing liquid into or bordering an underground area containing said mineral values; fracturing said underground area by means of pressurized fluid within said area; thereafter treating said mineral values by the injection into said area of treatment fluid; and recovering the so-treated mineral values.

2. A method according to claim 1, wherein the freezing liquid is introduced under pressure sufficient to effect fracturing of said underground area and constitutes pressurized fluid within the area.

3. A method according to claim 1, wherein the mineral values to be recovered are metallic and in sulfide form, and the freezing liquid is liquified oxygen.

4. A method according to claim 1, wherein water is injected into one or more relatively dry and pervious control locations contiguous with the area to be treated, so as to freeze and provide a temporary barrier to flow from said area.

5. A method according with claim 1, wherein a gas is first injected into the area under pressure to displace any ground water present to one or more control barrier locations.

6. A method in accordance with claim 5, wherein the gas is oxygen.

7. A method according to claim 1, wherein the freezing liquid is a vaporizable liquified gas.

8. A method according to claim 1, wherein the mineral values to be recovered are metallic and in sulfide form, and the freezing liquid is liquified oxygen.

9. A method according to claim 8, wherein the mineral values to be recovered comprise at least a copper sulfide.

10. A method according to claim 1, wherein the treatment fluid is a leaching agent for solid mineral values in the underground areas.

11. A method according to claim 1, wherein the freezing liquid is first pumped into the area concerned under minimum pressure to accomplish freezing of any water present in the formation, and is then pumped under greatly increased, formation fracturing pressure for a period of time required to hydraulically fracture the formation.

12. A method according to claim 1, wherein a propping agent is introduced into the fractured underground area.

13. A method according to claim 1, wherein the freezing liquid is first injected into the borders of the underground area for establishing barriers to fluid flow from said area; and wherein the pressurized fluid is subsequently introduced into the said area for fracturing the same.

14. A method according to claim 1, wherein the mineral values to be recovered are metallic and in sulfide form, and pressurizing fluid is obtained by injecting liquid oxygen into said area.

15. A method of recovering solid mineral values in situ, comprising injecting a freezing liquid into or bordering an underground area containing said mineral values, said freezing liquid being introduced under pressure sufficient to effect fracturing of said underground area; thereafter treating said mineral values by the injection into said area of a treatment fluid; and recovering the so-treated mineral values.

* * * * *